United States Patent
Park et al.

(10) Patent No.: US 10,053,140 B2
(45) Date of Patent: Aug. 21, 2018

(54) TILTING STRUCTURE OF ELECTRICALLY POWERED STEERING APPARATUS AND ELECTRICALLY POWERED STEERING APPARATUS COMPRISING SAME

(71) Applicant: erae AMS Co., Ltd., Daegu (KR)

(72) Inventors: Se-Jung Park, Daegu (KR); Jung-Rak Son, Daegu (KR); Myung-Chul Jung, Daegu (KR); Yung-Taek Woo, Daegu (KR); Chae-Hyo Lim, Daegu (KR); Jung-Il Lee, Daegu (KR)

(73) Assignee: erae AMS Co., Ltd., Daegu (KR)

( * ) Notice: Subject to any disclaimer, the term of this patent is extended or adjusted under 35 U.S.C. 154(b) by 0 days.

(21) Appl. No.: 15/313,404

(22) PCT Filed: May 22, 2015

(86) PCT No.: PCT/KR2015/005163
§ 371 (c)(1),
(2) Date: Nov. 22, 2016

(87) PCT Pub. No.: WO2015/178724
PCT Pub. Date: Nov. 26, 2015

(65) Prior Publication Data
US 2017/0197653 A1    Jul. 13, 2017

(30) Foreign Application Priority Data
May 23, 2014 (KR) .......................... 10-2014-0062397

(51) Int. Cl.
*F16H 57/12* (2006.01)
*B62D 5/02* (2006.01)
(Continued)

(52) U.S. Cl.
CPC ......... *B62D 5/0409* (2013.01); *B62D 5/0403* (2013.01); *F16H 1/16* (2013.01);
(Continued)

(58) Field of Classification Search
CPC ........................... B62D 5/0409; B62D 5/0403
(Continued)

(56) References Cited

U.S. PATENT DOCUMENTS

| 8,443,689 B2 * | 5/2013 | Kawakubo ............. B62D 3/123 74/422 |
| 2003/0136211 A1 * | 7/2003 | Ishii ..................... B62D 5/0409 74/388 PS |

(Continued)

FOREIGN PATENT DOCUMENTS

| EP | 1069330 A2 | 1/2001 |
| EP | 1335154 A1 | 8/2003 |

(Continued)

*Primary Examiner* — Tony H Winner
(74) *Attorney, Agent, or Firm* — Novick, Kim & Lee, PLLC; Jae Youn Kim

(57) ABSTRACT

A tilting structure for providing a force for tilting a worm shaft of an electrically powered steering apparatus to a worm wheel includes: a guide block which is inserted into an insertion space of a housing of the electrically powered steering apparatus; an elastic member which is disposed within the guide block; and a plug which is movably disposed within the guide block and is elastically supported by the elastic member to exert a tilting force to a bearing which supports the worm shaft.

6 Claims, 4 Drawing Sheets

(51) Int. Cl.
    *B62D 5/04*         (2006.01)
    *F16H 57/039*     (2012.01)
    *F16H 1/16*         (2006.01)
    *F16H 57/02*       (2012.01)

(52) U.S. Cl.
    CPC ........... *F16H 57/039* (2013.01); *F16H 57/12* (2013.01); *F16H 2057/02034* (2013.01); *F16H 2057/126* (2013.01)

(58) Field of Classification Search
    USPC ........................................... 180/444; 74/425
    See application file for complete search history.

(56) References Cited

U.S. PATENT DOCUMENTS

| | | | | |
|---|---|---|---|---|
| 2013/0126260 A1* | 5/2013 | Kim | ................. | B62D 5/0409 |
| | | | | 180/444 |
| 2014/0174843 A1* | 6/2014 | Kimoto | ............... | B62D 5/0424 |
| | | | | 180/444 |

FOREIGN PATENT DOCUMENTS

| | | |
|---|---|---|
| JP | 2002-098198 A | 4/2002 |
| JP | 2010-023772 A | 2/2010 |
| KR | 10-2008-0036303 A | 4/2008 |
| KR | 10-1124840 B1 | 3/2012 |
| KR | 10-2012-0137035 A | 12/2012 |
| KR | 10-2012-0140303 A | 12/2012 |
| KR | 10-2013-0003312 | 1/2013 |

\* cited by examiner

TILTING STRUCTURE OF ELECTRICALLY POWERED STEERING APPARATUS AND ELECTRICALLY POWERED STEERING APPARATUS COMPRISING SAME

CROSS-REFERENCE TO RELATED APPLICATION

This application is a national-entry under 35 USC § 371 of PCT/KR2015/005163 filed on May 22, 2015, and claims priority to Korean Patent Application No. 10-2014-0062397 filed in the Korean Intellectual Property Office on May 23, 2014, the entire contents of which are incorporated herein by reference.

TECHNICAL FIELD

The present invention relates to a tilting structure for tilting a worm shaft of an electrically powered steering apparatus.

BACKGROUND ART

Electrically powered steering apparatus which assist a steering force of a vehicle using a driving force of a motor has been known. Among such electrically powered steering apparatus, a column-type electrically powered steering apparatus which transmits a driving force of a motor to a steering shaft such as a steering column has been introduced.

Generally, an electrically powered steering apparatus controls a motor based on driving conditions such as a vehicle speed and a steering torque obtained from a vehicle speed sensor and a steering torque sensor to assist a steering force and to enhance a steering feeling.

In a column-type electrically powered steering apparatus, a worm gear is provided to a worm shaft which is connected to an outer shaft of a motor and a worm wheel is provided to a steering shaft, and the worm gear and the worm wheel are engaged with one another so that a driving force of a motor is transmitted to a steering shaft.

Such a column-type electrically powered steering apparatus may be exposed to problems of increase of backlash by clearance due to abrasion of gears or manufacturing clearance and vibration or noise. In order to solve these problems, an electrically powered steering apparatus having a tilting structure which tilts a worm shaft toward a worm wheel so as to compensate clearance due to abrasions has been introduced.

A conventional tilting structure has a structure extruded to the outside of an electrically powered steering apparatus, so it may be released or broken by external shock, and since it is configured to be able to regulate a tilting amount, clearance of a tilting structure and assembling clearance may also be added and this may negatively affect the performance of an electrically powered steering apparatus.

DETAILED DESCRIPTION OF THE INVENTION

Technical Problem

The present invention has been made in an effort to provide a tilting structure and an electrically powered steering apparatus including the same which can be easily assembled and has minimized clearances to have an enhanced performance.

Technical Solution

In an exemplary embodiment, a tilting structure for providing a force for tilting a worm shaft of an electrically powered steering apparatus to a worm wheel includes: a guide block which is inserted into an insertion space of a housing of the electrically powered steering apparatus; an elastic member which is disposed within the guide block; and a plug which is movably disposed within the guide block and is elastically supported by the elastic member to exert a tilting force to a bearing which supports the worm shaft.

A guide hole which guides movement of the plug may be formed in the guide block.

A guide groove may be formed on an outer surface of the guide block, and a guide protrusion which is inserted into the guide groove to be guided thereby may be formed in the housing.

The guide block may be provided with a fixing pin hole into which a fixing pin which fixes the plug in a state of compressing the elastic member is inserted.

The fixing pin may be removed after the guide block is inserted into the housing of the electrically powered steering apparatus in a state that the fixing pin is inserted into the fixing pin hole such that the plug is fixed to compress the elastic member.

The guide block may include an auxiliary guide hole, and wherein the guide block comprises: a protrusion which is supported by the elastic member and is guided by the guide hole; and an insertion protrusion which is inserted into the auxiliary guide hole to be guided thereby.

An electrically powered steering apparatus according to an embodiment of the present invention includes: a motor; a worm shaft which is provided with a worm gear and is connected to an outer shaft of the motor so as to rotate therewith; a worm wheel which is coupled to a steering shaft and is engaged with the worm gear; a bearing which supports the worm shaft; and a tilting structure which exerts a tilting force to the bearing such that the worm shaft is tilted toward the worm wheel. The tilting structure includes: a guide block which is inserted into an insertion space of a housing of the electrically powered steering apparatus; an elastic member which is disposed within the guide block; and a plug which is movably disposed within the guide block and is elastically supported by the elastic member to exert a tilting force to a bearing which supports the worm shaft.

Advantageous Effects

According to the present invention, a tilting structure can be easily assembled and clearances are minimized so that the performance of an electrically powered steering apparatus can be enhanced.

DETAILED DESCRIPTION OF THE EMBODIMENTS

An embodiment of the present invention will be explained in detail with reference to the accompanying drawings.

A motor 20 of an electrically powered steering apparatus generates a steering assistant force, and it is configured such that power of the motor 20 can be transmitted to a steering shaft 1.

Figure 1:
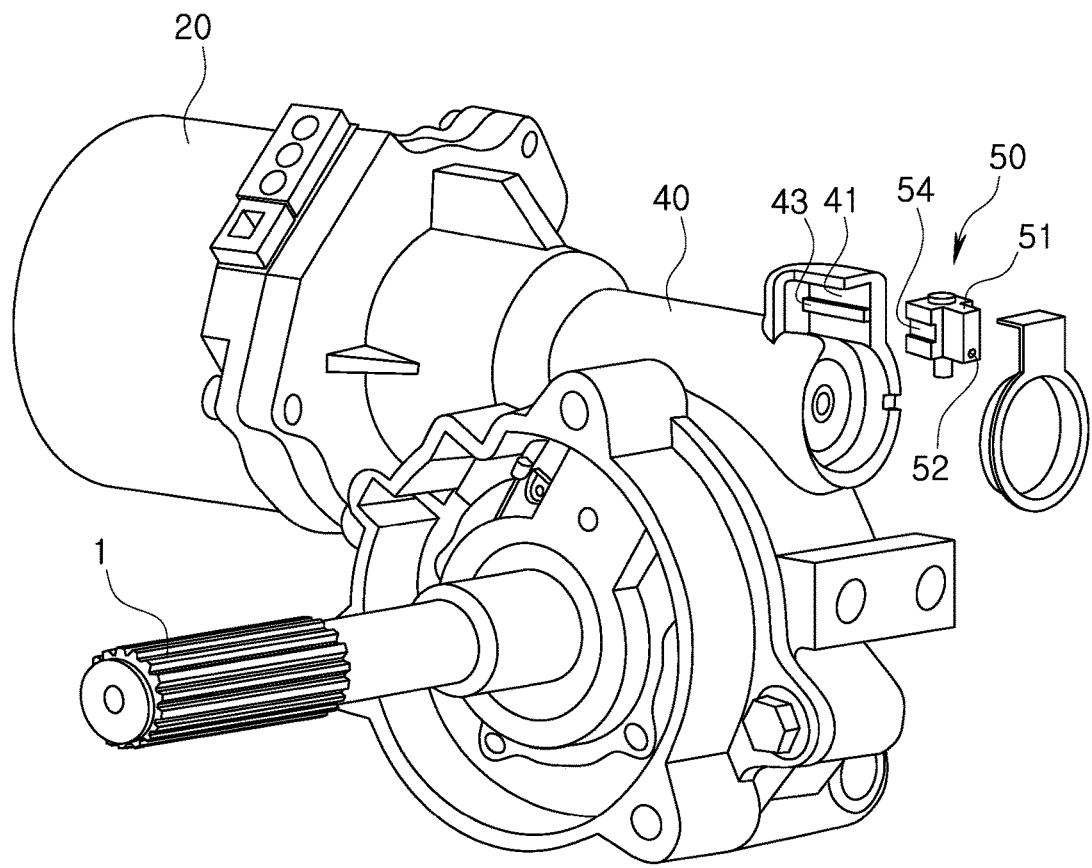
FIG. 1 is a schematic perspective view of an electrically powered steering apparatus according to an embodiment of the present invention.
Figure 2:
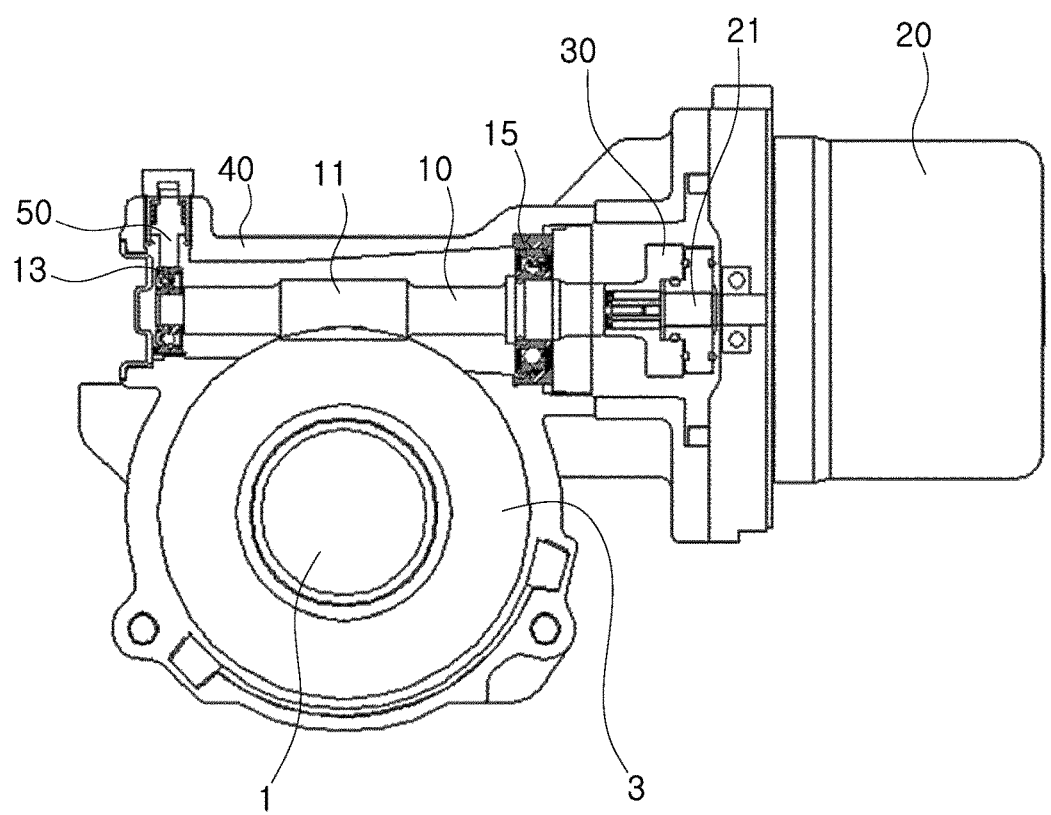
FIG. 2 is a partial sectional view of an electrically powered steering apparatus according to an embodiment of the present invention.

Referring to FIG. 1 and FIG. 2, a worm shaft 10 which is rotated by the power of the motor 20 is provided. The worm shaft 10 has a worm gear 11, and the worm gear 11 is engaged with a worm wheel 3 which is provided to the steering shaft 1. At this time, the worm shaft 10 is housed within a housing 40.

A motor coupling 30 may connect a motor output shaft 21 to the worm shaft 10. The motor coupling 30 is connected respectively to the output shaft 21 of the motor 20 and the worm shaft 10 to play a role of transmitting the power of the motor 20 to the worm shaft 10. The worm shaft 10 may be eccentrically connected to the output shaft 21 of the motor 20 via the motor coupling 30.

A tilting structure 50 which provides a force for tilting the worm shaft 10 toward the worm wheel 3 to the worm shaft 10 so that the clearance between the worm gear 11 and the worm wheel may be absorbed is provided. For example, the tilting structure 50 may be configured to support an outer surface of a bearing 13 which supports an end of the worm shaft 10. At this time, the worm shaft 10 may be rotatably supported by two bearings 13 and 15 which are respectively disposed on both ends thereof, and the tilting structure 50 may be disposed to support the beating 13 among the two bearings 13 and 15 which is disposed farther from the motor 20.

The tilting structure 50 elastically supports the bearing 13 supporting the worm shaft 10 to be biased in a direction (downward direction in FIG. 2) toward the worm wheel 13, so a clearance between the worm gear 11 and the worm wheel 13 may be compensated.

Figure 3:
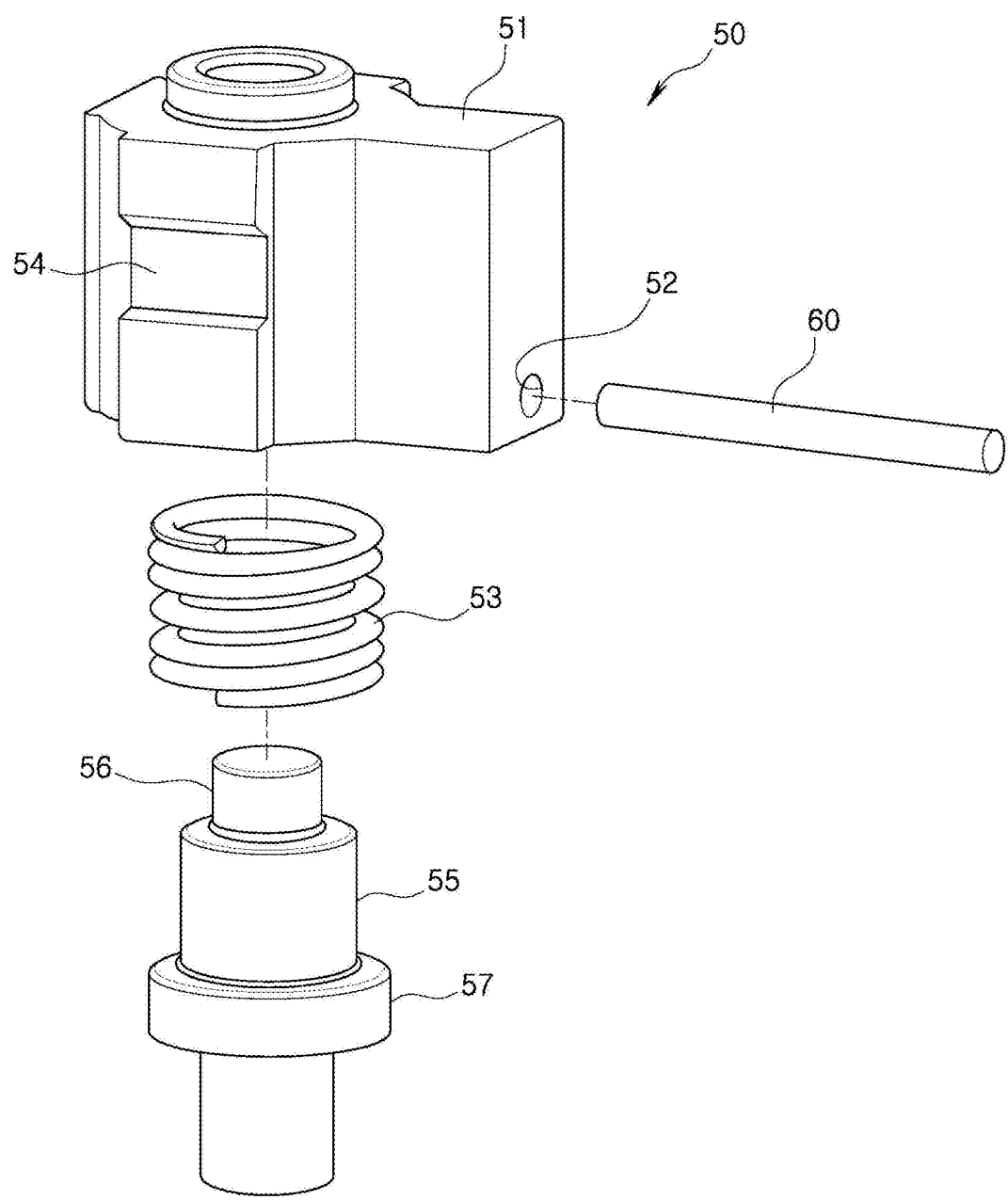
FIG. 3 is an exploded perspective view of an electrically powered steering apparatus according to an embodiment of the present invention.
Figure 4:
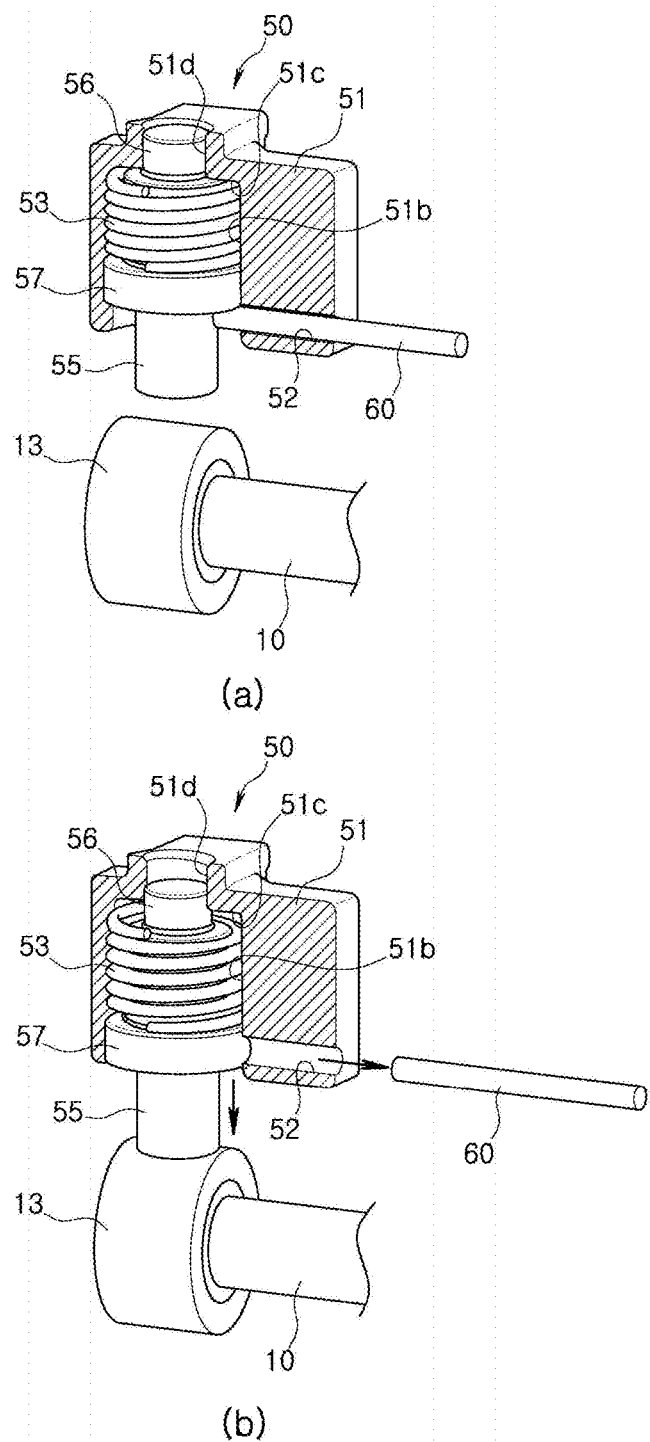
FIG. 4 is a drawing for explaining a mounting process of a tilting structure of an electrically powered steering apparatus according to an embodiment of the present invention.

Meanwhile, referring to FIG. 3 and FIG. 4, the tilting structure 50 may include a guide block 51, an elastic member 53 and a plug 55. For example, the elastic member 53 may be a coil spring.

The guide block 51 is inserted into an insertion space 41 which is provided to the housing 40. At this time, a guide groove 54 is formed on an outer surface of the guide block 51 and a guide protrusion 43 is provided in the insertion space 41, and the guide block 51 is inserted into the insertion space 41 in a state that the guide protrusion 43 is engaged with the guide groove 54.

A guide hole 51b may be formed in the guide block 51, and the elastic member 53 and the plug 55 may be disposed in the guide hole 51b as shown in FIG. 4.

The plug 55 is movably disposed within the guide block 51 and is elastically supported by the elastic member 53 so as to exert a tilting force to the bearing 13 which supports the worm shaft 10.

In more detail, the elastic member 53 is supported against a step 51c which is provided in the guide block 51 at one end thereof and supports a protrusion 57 which is formed on the plug 55 at the other end there. Accordingly, by an elastic resilient force of the elastic member 53, the plug 55 supports the bearing 13 which supports the worm shaft 10.

At this time, the protrusion 57 contacts an inner surface of the guide hole 51b of the guide block 51 to be guided. Meanwhile, an insertion protrusion 56 is formed at a frontal end of the plug 55, and the insertion protrusion 56 is inserted into an auxiliary guide hole 51d which is formed in the guide block 51. Accordingly, the guide block 51 and the plug 55 are connected via double guiding structure, so the elastic member 53 can be prevented from being inclined while being installed.

The tilting structure 50 according to an embodiment of the present invention has a unitary assembled structure for ease of an installation.

In detail, the guide block 51 is provided with a fixing pin hole 52 into which a fixing pin 60, which fixes the plug 55 in a state of compressing the elastic member 53, is inserted. Referring to (a) of FIG. 4, before the tilting structure 50 is installed, the fixing pin 60 supports the plug 55 so as to be fixed at a state of compressing the elastic member 53. That is, the fixing pin 60 is inserted into the fixing pin hole 52 of the guide block 51, and the protrusion 57 of the plug 55 is supported by the fixing pin 60 to compress the elastic member 53. At this time, as shown in (a) of FIG. 4, the plug 55 is maintained at a state of being spaced from the bearing 13 which supports the worm shaft 10.

If the fixing pin 60 is removed after the tilting structure 50 is inserted into the housing 40, the state shown in (b) of FIG. 4 is obtained. That is, since the fixing pin 60 which supports the plug 55 is removed, the plug 55 moves toward the bearing 13 by an elastic resilient force of the elastic member 53 so as to contact the bearing 13, and in this state the plug 55 is maintained at a state of continuously pushing the bearing 13 toward the worm wheel 3 by an elastic force of the elastic member 53. Accordingly, a clearance between the worm gear 11 and the worm wheel 3 can be automatically absorbed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to an electrically powered steering apparatus and can be applied to a part of a vehicle, so the present invention has an industrial applicability.

The invention claimed is:

1. A tilting structure for providing a force for tilting a worm shaft of an electrically powered steering apparatus to a worm wheel, comprising:
   a guide block configured to be inserted into an insertion space of a housing of the electrically powered steering apparatus;
   an elastic member configured to be disposed within the guide block;
   a plug configured to be movably disposed within the guide block and elastically supported by the elastic member to exert a tilting force to a bearing supporting the worm shaft; and
   a fixing pin configured to be inserted through a fixing pin hole of the guide block so as to restrict movement of the plug,
   wherein the plug is configured to be retracted into a guide hole of the guide block and to compress the elastic member when the fixing pin is inserted through the fixing pin hole such that the plug is prevented from applying the tilting force to the bearing, and
   wherein the plug is configured to be protruded out of the guide hole of the guide block by an elastic force of the elastic member when the fixing pin is removed from the fixing pin hole such that the plug is configured to apply the tilting force to the bearing.

2. The tilting structure of claim 1, wherein a guide groove is disposed on an outer surface of the guide block, and wherein a guide protrusion configured to be inserted into the guide groove and to be guided thereby is disposed in the housing.

3. The tilting structure of claim 1, wherein the guide block comprises an auxiliary guide hole connected to the guide hole, and wherein the plug comprises: a protrusion configured to be disposed within the guide hole to be supported by the elastic member with respect to the guide block; and an insertion protrusion configured to be inserted into the auxiliary guide hole.

4. An electrically powered steering apparatus, comprising:
a motor;
a worm shaft provided with a worm gear and connected to an outer shaft of the motor so as to rotate therewith;
a worm wheel configured to be coupled to a steering shaft and to be engaged with the worm gear;
a bearing supporting the worm shaft; and
a tilting structure exerting a tilting force to the bearing such that the worm shaft is tilted toward the worm wheel,
wherein the tilting structure comprises:
a guide block configured to be inserted into an insertion space of a housing of the electrically powered steering apparatus;
an elastic member configured to be disposed within the guide block;
a plug configured to be movably disposed within the guide block and elastically supported by the elastic member to exert the tilting force to the bearing supporting the worm shaft; and
a fixing pin configured to be inserted through a fixing pin hole of the guide block so as to restrict movement of the plug,
wherein the plug is configured to be retracted into a guide hole of the guide block and to compress the elastic member when the fixing pin is inserted through the fixing pin hole such that the plug is prevented from applying the tilting force to the bearing, and
wherein the plug is configured to be protruded out of the guide hole of the guide block by an elastic force of the elastic member when the fixing pin is removed from the fixing pin hole such that the plug is configured to apply the tilting force to the bearing.

5. The electrically powered steering apparatus of claim 4, wherein a guide groove is disposed on an outer surface of the guide block, and wherein a guide protrusion configured to be inserted into the guide groove and to be guided thereby is disposed in the housing.

6. The electrically powered steering apparatus of claim 4, wherein the guide block comprises an auxiliary guide hole connected to the guide hole, and wherein the plug comprises: a protrusion configured to be disposed within the guide hole to be supported by the elastic member with respect to the guide block; and an insertion protrusion configured to be inserted into the auxiliary guide hole.

* * * * *